US006873931B1

United States Patent
Nower et al.

(10) Patent No.: US 6,873,931 B1
(45) Date of Patent: Mar. 29, 2005

(54) ACCELEROMETER BASED ANGULAR POSITION SENSOR

(75) Inventors: Daniel L. Nower, Knoxville, TN (US); Albert C. Abnett, Nevada, OH (US); David A. Hinkle, Knoxville, TN (US)

(73) Assignee: CSI Technology, Inc., Wilmington, DE (US)

( * ) Notice: Subject to any disclaimer, the term of this patent is extended or adjusted under 35 U.S.C. 154(b) by 184 days.

(21) Appl. No.: 09/685,317

(22) Filed: Oct. 10, 2000

(51) Int. Cl.[7] .............................................. G05D 17/02
(52) U.S. Cl. ...................................................... 702/151
(58) Field of Search ................................ 702/151, 195, 702/141; 473/316, 219, 289; 73/854, 579, 510; 29/720, 407; 356/477, 141, 35; 318/651, 571; 324/202, 207; 700/264, 183; 404/84; 304/18; 188/378; 340/686.3; 414/699; 600/109; 78/510

(56) References Cited

U.S. PATENT DOCUMENTS

| | | | |
|---|---|---|---|
| 3,899,028 A | | 8/1975 | Morris et al. |
| 3,974,699 A | | 8/1976 | Morris et al. |
| 4,013,945 A | * | 3/1977 | Grosso .................. 324/207.25 |
| 4,021,774 A | * | 5/1977 | Asmundsson et al. ........ 340/18 |
| 4,510,802 A | | 4/1985 | Peters |
| 4,512,192 A | | 4/1985 | Peters |
| 4,518,855 A | | 5/1985 | Malak |
| 4,566,327 A | * | 1/1986 | Rider .......................... 73/510 |
| 4,586,377 A | | 5/1986 | Schmid |
| 4,590,801 A | | 5/1986 | Merhav |
| 4,592,233 A | | 6/1986 | Peters |
| 4,698,491 A | | 10/1987 | Lysen |
| 4,821,572 A | | 4/1989 | Hulsing, II |
| 4,891,764 A | * | 1/1990 | McIntosh ..................... 700/183 |
| 4,972,332 A | | 11/1990 | Luebbering et al. |
| 4,984,173 A | | 1/1991 | Imam et al. |

(Continued)

*Primary Examiner*—Bryan Bui
*Assistant Examiner*—Tung S Lau
(74) *Attorney, Agent, or Firm*—Luedeka, Neely & Graham, P.C.

(57) ABSTRACT

An alignment system having an angular position sensing device using an accelerometer to determine the angular position of the device. Preferably, the angular position sensing device incorporates two dual-axis accelerometers oriented in a spaced apart relation for determining the angular position of a rotating body in space. The angular position sensing device is operable to account for centrifugal and angular acceleration errors due to the rotation of the rotating body in space, thereby providing an accurate angular position of the rotating body. The angular position sensor also determines the angular position of the rotating body based on a sensing axis having the greatest range of sensitivity according to the angular position of the rotating body.

9 Claims, 10 Drawing Sheets

U.S. PATENT DOCUMENTS

| | | | |
|---|---|---|---|
| 4,990,840 A | * 2/1991 | Migda | 318/571 |
| 5,026,998 A | 6/1991 | Hölzl | |
| 5,114,094 A | 5/1992 | Harris | |
| 5,213,184 A | * 5/1993 | Legouis et al. | 188/378 |
| 5,219,379 A | 6/1993 | Good et al. | |
| 5,247,466 A | 9/1993 | Shimada et al. | |
| 5,351,540 A | 10/1994 | Gee | |
| 5,383,363 A | 1/1995 | Kulmaczewski | |
| 5,385,047 A | 1/1995 | Cochard et al. | |
| 5,396,797 A | 3/1995 | Hulsing, II | |
| 5,418,442 A | 5/1995 | Araki | |
| 5,430,539 A | 7/1995 | Lysen | |
| 5,493,909 A | 2/1996 | Araki | |
| 5,508,609 A | 4/1996 | Parkinson et al. | |
| 5,721,605 A | 2/1998 | Mizutani | |
| 5,727,900 A | * 3/1998 | Sandstrom | 404/84.1 |
| 5,728,936 A | 3/1998 | Lutz | |
| 5,798,828 A | * 8/1998 | Thomas et al. | 356/141.3 |
| 5,845,236 A | * 12/1998 | Jolly et al. | 702/195 |
| 5,890,870 A | * 4/1999 | Berger et al. | 414/699 |
| 5,896,672 A | 4/1999 | Harris | |
| 6,040,903 A | 3/2000 | Lysen et al. | |
| 6,046,799 A | 4/2000 | Lysen | |
| 6,049,378 A | 4/2000 | Busch et al. | |
| 6,304,190 B1 | * 10/2001 | Blasing | 340/686.3 |
| 6,471,637 B1 | * 10/2002 | Green et al. | 600/109 |
| 6,473,713 B1 | * 10/2002 | McCall et al. | 702/141 |
| 2002/0107084 A1 | * 8/2002 | Weiss et al. | 473/219 |

* cited by examiner

ACCELEROMETER BASED ANGULAR POSITION SENSOR

FIELD OF THE INVENTION

This invention relates generally to measuring the angular orientation of a rotating object about a point. More particularly, this invention relates to an angular position sensor utilizing two dual-axis accelerometer sensors operable to nullify centrifugal and angular error effects while determining the angular position of a rotating body in space, such as a shaft alignment bracket.

BACKGROUND AND SUMMARY OF INVENTION

Because of disadvantages existing with respect to angular position sensors, such as slow data sampling rates, there exists a need in the art for an improved angular position sensor that is capable of accurate dynamic angle measurements. In particular, an improved angular position sensor is needed in shaft alignment systems. Furthermore, there exists a need for an angular position sensor which is capable of nullifying dynamic error anomalies associated with dynamic angle sensing. Additionally, there is a need for an alignment system including an angular position sensor that is easier to set up and use and which reduces the error in measurement and other problems which inherently result from the design of prior art devices.

The present invention overcomes the difficulties and disadvantages of the prior art by providing an angular position sensing apparatus for mounting on a rotatable body operable to determine an angular position of the rotatable body relative to a point in space. The apparatus utilizes a first dual-axis accelerometer having a first sensing axis for sensing a first acceleration component and a second sensing axis for sensing a second acceleration component. The first and second sensing axes are in substantially perpendicular relation, the first dual-axis accelerometer operable to output a first signal proportional to the sensed first acceleration component and to output a second signal proportional to the sensed second acceleration component. The apparatus also includes a second dual-axis accelerometer having a third sensing axis for sensing a third acceleration component and a fourth sensing axis for sensing a fourth acceleration component. Accordingly, the third and fourth sensing axes are in substantially perpendicular relation, the second dual-axis accelerometer operable to output a third signal proportional to the sensed third acceleration component and to output a fourth signal proportional to the sensed fourth acceleration component. It is preferred that the first and second dual-axis accelerometers are mounted in spaced apart relation on a printed circuit board defining a plane of reference. The apparatus also utilizes a microprocessor operable to determine the angular position of the body as the body rotates through a plurality of angular positions by selecting a fifth signal dependent on the first and third signals or a sixth signal dependent on the second and fourth signals, and determining the angular position of the rotatable body therefrom.

In one embodiment, an accelerometer based angular position sensor is used in an alignment system for aligning a centerline of a first shaft with a centerline of a second shaft. The shaft alignment system includes an analyzer having memory and a sensor head disposed on a mounting bracket and extending in a substantially perpendicular orientation with respect to the centerline of the first shaft. A collimated light source is mounted on the sensor head for transmitting a beam of energy in a direction that is substantially parallel to the first shaft. A photosensitive sensor is also mounted on the sensor head for sensing light and generating a position signal corresponding to a position of a light beam impinging upon the photosensitive sensor. The angular position sensing apparatus includes at least one accelerometer for generating a signal corresponding to the angular orientation of the sensor head with respect to the first shaft, and a microprocessor processes the angular position sensor signal generated by the angular position sensor, providing an output corresponding to the angular position of the sensor head relative to the first shaft.

BRIEF DESCRIPTION OF THE DRAWINGS

Further advantages of the invention will become apparent by reference to the detailed description of preferred embodiments when considered in conjunction with the figures, which are not to scale, wherein like reference numbers, indicate like elements through the several views, and wherein.

DETAILED DESCRIPTION

Figure 1:
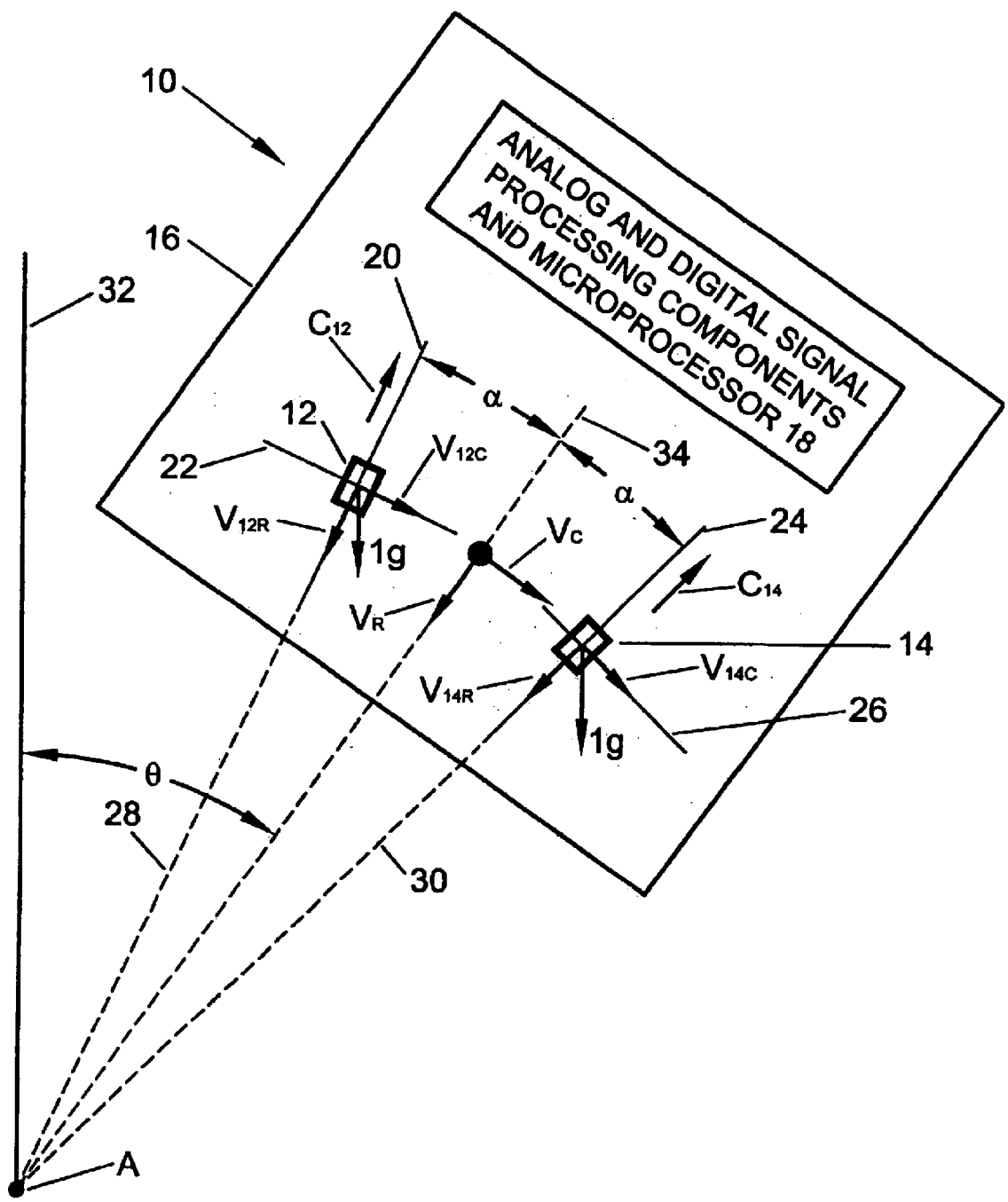
FIG. 1 is a depiction of an angular position sensor, according to a preferred embodiment of the invention.

Referring now to the Figures in which like reference numerals indicate like or corresponding features, there is shown in FIG. 1 an angular position sensor 10 for determining the angular position of a rotating body in space, such as a shaft, a coupling, or a rotor. The angular position sensor 10 is also operable to provide the angular position of a static body having moved from a first angular position to a second angular position. According to the invention, and described in greater detail below, the angular position sensor 10 is operable to nullify angular and centrifugal acceleration error contributions associated with measuring the angular position of a rotating body. As shown in FIG. 1, the angular position sensor 10 preferably includes a first dual-axis accelerometer 12 and a second dual-axis accelerometer 14, mounted in a spaced apart relation on a printed circuit board 16. The printed circuit board 16 includes a number of analog and digital signal processing components in addition to a microprocessor 18, such as a MC68HC912 16-bit microprocessor, manufactured by Motorola.

In a preferred embodiment of the invention, the angular position sensor 10 incorporates two dual-axis accelerometers 12 and 14, such as model ADXL202, manufactured by Analog Devices, located in Norwood, Mass. The ADXL202 is a dual-axis, surface micromachined accelerometer sensor. This particular accelerometer sensor combines the acceleration sensor and the signal conditioning features on a single chip. Additionally, the ADXL202 contains a pulse width modulated (PWM) digital output feature which obviates a need for A/D conversion of the output signal. As a note, it would be possible to substitute four single-axis accelerometers in place of the dual-axis accelerometers 12 and 14, but this would add cost, additional complexity, and require more space within the angular position sensor 10 to implement.

The dual-axis accelerometers 12 and 14 include first sensing axes 20 and 24, and second sensing axes 22 and 26, respectively. The sensing axes 20, 22, 24 and 26 of the dual-axis accelerometers are located such that the first sensing axes 20 and 24 are in substantially perpendicular relation with respect to the second sensing axes 22 and 26, respectively. Preferably, and according to the specific application of the angular position sensor 10, the dual-axis accelerometers 12 and 14 are mounted onto the printed circuit board 16 so that extensions of the first sensing axes 20 and 24 (shown as imaginary line extensions 28 and 30 in FIG. 1) intersect in a plane defined by the printed circuit board, hereinafter the printed circuit board plane, at a point A. Once the printed circuit board 16, including the first and second dual-axis accelerometers 12 and 14, is mounted on an object wherein an angular orientation is to be measured, it is preferred that point A substantially coincide with the rotating body's center of rotation. However, the angular position sensor 10 is operable to provide an angular position of a rotating body when point A and the center of rotation are not substantially coincident, as described further below.

According to the invention, the dual-axis accelerometers 12 and 14 are oriented on the printed circuit board 16 according to a specific angular measuring application. For example, the dual-axis accelerometers 12 and 14 may be located closer together or farther apart, and rotated relative to each other accordingly, depending on the desired location of point A and the dimensional constraints of the printed circuit board 16. However, it is preferred that the first sensing axes 20 and 24 are pointed substantially towards the center of rotation of the rotating body.

As best shown in FIG. 1, the first sensing axes 20 and 24 preferably intersect in the plane of the printed circuit board 16 at point A for each configuration of the dual-axis accelerometers 12 and 14. As described above, it is preferred that point A be substantially coincident with the center of rotation of the body and that the distance between point A and each accelerometer's center of rotation being substantially the same. Therefore, depending again on the specific measuring application, the angular position sensor 10 is preferably positioned with respect to the rotating body in order to locate point A substantially coincident to the body center of rotation. However, as described further below, it is possible to account and correct for deviations from the preferred angular position sensor 10 location. For example, it is possible that the positioning of the angular position sensor 10 may be constrained to a particular location with respect to the rotating body, wherein the location of point A is not substantially coincident with the body center of rotation.

Based on the above preferred orientation of the dual-axis accelerometer sensors 12 and 14 with respect to the printed circuit board 16 and rotating body, and assuming that the location of the printed circuit board 16 is such that the plane of rotation of the body is substantially the same as the printed circuit board, the operation of the angular position sensor 10 is described. Accordingly, when the angular position sensor 10 is mounted on the body and the body is subsequently rotated, it is seen that the first sensing axes 20 and 24 are subject to a radial acceleration component, whereas the second sensing axes 22 and 26 are subject to an angular acceleration component. Hereinafter, plane of rotation of the rotating body refers to a plane mapped by a point located at a circumferential periphery of the rotating body as the body rotates.

Figure 2:
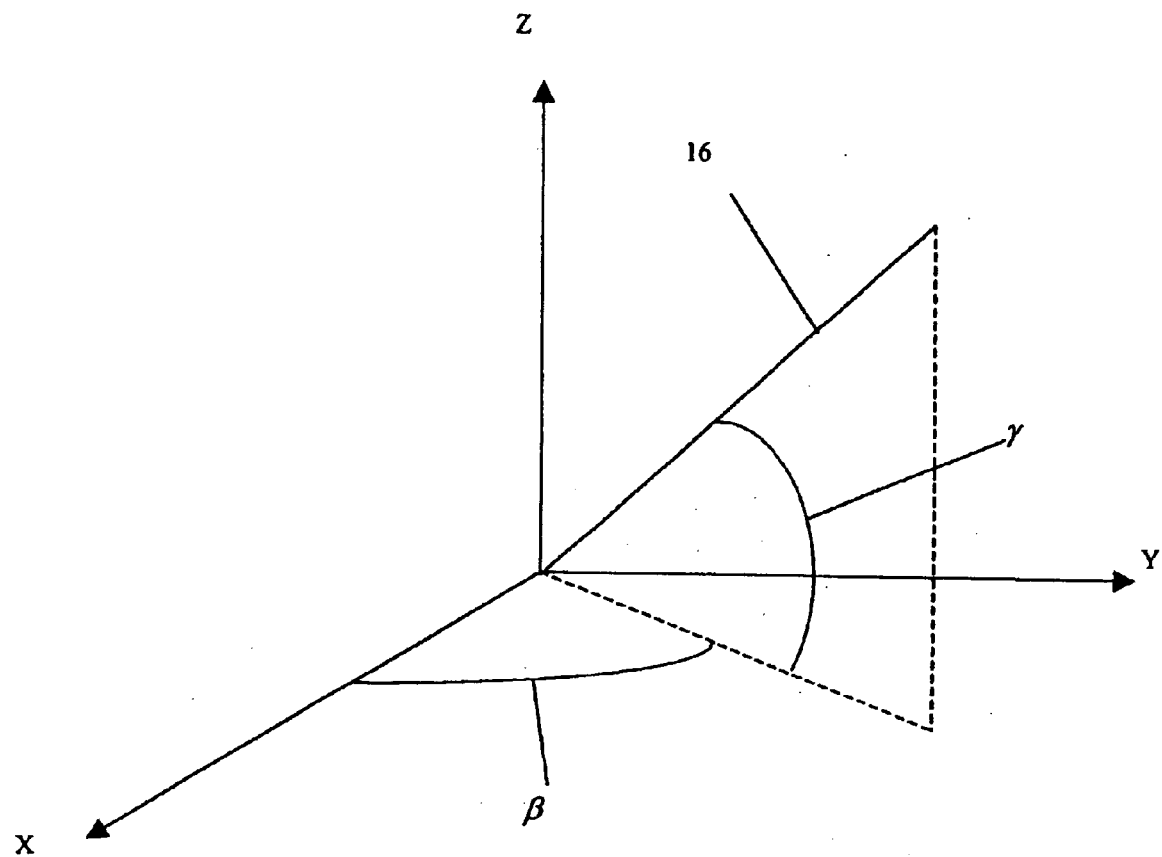
FIG. 2 depicts a coordinate system, depicting various planar orientations.

With additional reference to FIG. 2, a 3-dimensional coordinate system is shown, illustrating planar spatial relationships. For purposes of description of the invention, the printed circuit board 16 is described as a plane of reference, wherein the accelerometers 12 and 14 are mounted thereon in the preferred orientation as described above. As shown in FIG. 2, the 3-dimensional coordinate system includes an x-y plane, x-z plane and y-z plane, the acceleration due to gravity being perpendicular to the x-y plane in the negative z direction. For purposes of illustration, the angle $\gamma$ is defined as a tilt angle between the printed circuit board plane and the x-y plane. Correspondingly, the angle $\beta$ is defined as the angle between the x and y axes in the x-y plane. For applications in which the printed circuit board 16 and dual-axis accelerometers 12 and 14 are oriented substantially perpendicular to the x-y plane ($\gamma=0$), and wherein the plane of rotation of the rotating object is parallel to the printed circuit board plane, the equations for calculating the angular position of the rotating body with the x or y axis being a reference position are:

$$V_{12R}=\cos(\theta+\alpha)*g-C_{12}=\cos(\theta)*\cos(\alpha)-\sin(\theta)*\sin(\alpha)-C_{12}$$

$$V_{12C}=\sin(\theta+\alpha)*g-A_{12}=\sin(\theta)*\cos(\alpha)+\cos(\theta)*\sin(\alpha)-A_{12}$$

$$V_{14R}=\cos(\theta-\alpha)*g-C_{14}=\cos(\theta)*\cos(\alpha)+\sin(\theta)*\sin(\alpha)-C_{14}$$

$$V_{14C}=\sin(\theta+\alpha)*g-A_{14}=\sin(\theta)*\cos(\alpha)-\cos(\theta)*\sin(\alpha)-A_{14}$$

where, g=1

$V_{12R}$=acceleration sensed along axis 20 of dual-axis accelerometer 12

$V_{12C}$=acceleration sensed along axis 22 of dual-axis accelerometer 12

$V_{14R}$=acceleration sensed along axis 24 of dual-axis accelerometer 14

$V_{14C}$=acceleration sensed along axis 26 of dual-axis accelerometer 14

$C_{12}$=centrifugal acceleration exerted on dual-axis accelerometer 12

$A_{12}$=angular acceleration exerted on dual-axis accelerometer 12

$C_{14}$=centrifugal acceleration exerted on dual-axis accelerometer 14

$A_{14}$=angular acceleration exerted on dual-axis accelerometer 14

Accordingly, by subtracting the respective acceleration components along the radial and tangential axes 20–26, the equations become:

$$V_R=V_{12R}-V_{14R}-2*\sin(\theta)*\sin(\alpha)+C_{14}-C_{12}$$

$$V_C=V_{12C}-V_{14C}=2*\cos(\theta)*\sin(\alpha)+A_{14}-A_{12}$$

but, since $A_{14}=A_{12}$ and $C_{14}=C_{12}$, $$V_R = -2*\sin(\theta)*\sin(\alpha)$$

$$V_C = 2*\cos(\theta)*\sin(\alpha)$$

where $V_R$ and $V_C$ are the 'virtual' acceleration components at the midpoint of the first and second dual-axis accelerometers 12 and 14, by rearranging the equations, $$\theta = \sin^{-1}(V_R/(-2*\sin(\alpha))) \text{ or,}$$

$$\theta = \cos^{-1}(V_R/(2*\sin(\alpha)))$$

According to the above equations, $\theta$ is the angular position of the rotating body with respect to the z-axis (line 32 in FIG. 1) in the configuration wherein the printed circuit board plane is perpendicular to the x-y plane and wherein the plane of rotation of the rotating body is coincident with the printed circuit board plane. The angle $\alpha$ is the angular separation between the line 34, representing a radial line originating at the center of rotation, and the sensing axis 20 or 24 of either the first or second dual-axis accelerometer 12 or 14, respectively. As shown in FIG. 1, it is preferred that the dual-axis accelerometers 12 and 14 be symmetrically located with respect to the radial line 34. That is, it is preferred that the angle $\alpha$ is the same as measured between lines 28 or 30 and the radial line 34.

As shown by the above equations, the centrifugal and angular acceleration errors induced by the rotating body are completely cancelled out and a true angular position $\theta$ of the rotating body is determined. It is important to account for these centrifugal and angular acceleration errors in order to obtain an accurate determination of the angular position $\theta$ as the body is rotated through various angular positions.

For applications wherein the printed circuit board 16 and associated first and second dual-axis accelerometers 12 and 14 are skewed at an angle $\gamma$ (FIG. 2) with respect to the plane of rotation of the rotating body, a corresponding correction factor must be included into the above equations to account for the misalignment between the printed circuit board plane and the plane of rotation of the rotating body. If a correction factor is not included into the above equations for a particular skewed printed circuit board 16 configuration, an associated error will show up in the determined rotation angle $\theta$. For a skewed printed circuit board 16 application, the above equations become:

$$V_{12R} = (\cos(\theta+\alpha)*g/\cos(\gamma)) - C_{12} = ((\cos(\theta)*\cos(\alpha)-\sin(\theta)*\sin(\alpha))/\cos(\gamma)) - C_{12}$$

$$V_{12C} = (\sin(\theta+\alpha)*g/\cos(\gamma)) - A_{12} = ((\sin(\theta)*\cos(\alpha)+\cos(\theta)*\sin(\alpha))/\cos(\gamma)) - A_{12}$$

$$V_{14R} = (\cos(\theta-\alpha)*g/\cos(\gamma)) - C_{14} = ((\cos(\theta)*\cos(\alpha)+\sin(\theta)*\sin(\alpha))/\cos(\gamma)) - C_{14}$$

$$V_{14C} = (\sin(\theta+\gamma)*g/\cos(\gamma)) - A_{14} = ((\sin(\theta)*\cos(\alpha)-\cos(\theta)*\sin(\alpha))/\cos(\gamma)) - A_{14}$$

where, g=1

$V_{12R}$=acceleration sensed along axis 20 of dual-axis accelerometer 12

$V_{12C}$=acceleration sensed along axis 22 of dual-axis accelerometer 12

$V_{14R}$=acceleration sensed along axis 24 of dual-axis accelerometer 14

$V_{14C}$=acceleration sensed along axis 26 of dual-axis accelerometer 14

$C_{12}$=centrifugal acceleration exerted on dual-axis accelerometer 12

$A_{12}$=angular acceleration exerted on dual-axis accelerometer 12

$C_{14}$=centrifugal acceleration exerted on dual-axis accelerometer 14

$A_{14}$=angular acceleration exerted on dual-axis accelerometer 14

Accordingly, by subtracting the respective acceleration components along the radial and tangential axes 20–26, the equations become:

$$V_R = V_{12R} - V_{14R}(-2*\sin(\theta)*\sin(\alpha))/\cos(\gamma)) + C_{14} - C_{12}$$

$$V_C = V_{12C} - V_{14C} = (2*\cos(\theta)*\sin(\alpha))/\cos(\gamma)) + A_{14} - A_{12}$$

but, since $A_{14} = A_{12}$ and $C_{14} = C_{12}$, $$V_R = -2*\sin(\theta)*\sin(\alpha)/\cos(\gamma)$$

$$V_C = 2*\cos(\theta)*\sin(\alpha)/\cos(\gamma)$$

where $V_R$ and $V_C$ are the 'virtual' acceleration components at the midpoint of the first and second dual-axis accelerometers 12 and 14, by rearranging the equations, $$\theta = \sin^{-1}(V_R*\cos(\gamma)/(-2*\sin(\alpha))) \text{ or,}$$

$$\theta = \cos^{-1}(V_R*\cos(\gamma)/(2*\sin(\alpha)))$$

Furthermore, for sensing applications where the point A is not coincident with the center of rotation of the rotating body, associated centrifugal and angular errors are introduced into the above rotational angle $\theta$ calculations due to the differing locations of the point A and the true center of rotation of the rotating body. Any associated centrifugal error is a function of the rotational frequency of the rotating body and the difference between the true center of rotation and the sensing axes 20 and 24 intersection point A. However, these centrifugal errors may be calculated and accounted for in the above rotational angle $\theta$ calculations. For example, it is possible to feedback the centrifugal error calculation into the angle calculation utilizing an error compensating feedback controller in the microprocessor 18. As an example, for a particular embodiment of the invention wherein the accelerometers have a spacing of about 2.25 inches and a is equal to about –/+10 degrees, respectively, Table 1 lists the associated maximum angular errors due to the associated centrifugal and angular accelerations as a function of the difference between the true center of rotation and the sensing axes 20 and 24 intersection point. It should be noted that the angular error due to centrifugal acceleration is only experienced when using tangential axis readings.

Similarly, the angular error due to angular acceleration is only experienced when using radial axis readings. However, even if the sensors are mounted at a different distance from the shaft center so that the two centers of rotation do not exactly coincide, the error is much less than the uncompensated error. In one embodiment, which is not preferred, the processor 18 is programmed with an error table such as shown in Table 1 and is programmed to receive error inputs as to the actual differential radius. Using the error table and the actual differential radius, the processor corrects the calculated angular position by correcting the sensed centrifugal and angular acceleration.

TABLE 1

| Radius of Rotation (inches) | Differential Radius (inches) | Centrifical Acceleration (g) | Tangential Acceleration (g) | Maximum Angular Error Due To Centrifical Acceleration (degrees) | Maximum Tangential Error Due To Angular Acceleration (degrees) |
|---|---|---|---|---|---|
| 3.0  | −3.0 | 0.0766 | 0.0976 | 0.15 | 0.17 |
| 6.0  | 0.0  | 0.1533 | 0.1952 | 0.00 | 0.34 |
| 9.0  | 3.0  | 0.2299 | 0.2928 | 0.03 | 0.51 |
| 12.0 | 6.0  | 0.3065 | 0.3904 | 0.12 | 0.68 |
| 15.0 | 9.0  | 0.3831 | 0.4880 | 0.22 | 0.85 |
| 18.0 | 12.0 | 0.4598 | 0.5856 | 0.33 | 1.02 |
| 21.0 | 15.0 | 0.5364 | 0.6832 | 0.45 | 1.19 |
| 24.0 | 18.0 | 0.6130 | 0.7807 | 0.57 | 1.36 |
| 27.0 | 21.0 | 0.6896 | 0.8783 | 0.70 | 1.53 |
| 30.0 | 24.0 | 0.7663 | 0.9759 | 0.82 | 1.70 |

Referring now to FIGS. 3–7, a most preferred embodiment of the invention is shown. Accordingly, a laser shaft alignment system 40 utilizes an angular position sensor 113 to determine an angular position θ of a laser head 42 or 44. A complete description of laser alignment systems and associated mounting systems is disclosed in: U.S. Pat. No. 5,371,953, titled A Shaft Alignment Apparatus, issued Dec. 13, 1994, by Daniel L. Nower et al.; U.S. Pat. No. 5,684,578, entitled Laser Alignment Head for Use in Shaft Alignment, issued Nov. 4, 1997, by Daniel L. Nower et al.; and, U.S. Pat. No. 5,715,609, entitled Stationary Shaft Alignment Apparatus, issued Feb. 10, 1998, by Daniel L. Nower, all of which are hereby incorporated by reference. The above incorporated references fully describe the type of mounting system shown in FIG. 3, and how measurements are taken when utilizing such a system. As was described in the above referenced patents, the basic information to be gathered in the shaft alignment system 40 is the amount of offset and angularity between a projection coaxial to one shaft 46 and the other shaft 48.

The shaft alignment system 40 is used to determine an amount and direction of misalignment between first and second in-line shafts 46 and 48 (normally termed shaft centerline misalignment). The shafts 46 and 48 are shown coupled to each other by means of a coupling 50. The shafts 46 and 48 are part of the respective machines, such as a motor driving a pump through the shafts 46 and 48, and coupling 50. A first sensor head 42 (hereinafter head 42) and a second sensor head 44 (hereinafter head 44) are mounted on the shafts 46 and 48 using the mounting assemblies as described in the references cited above. As discussed further below, heads 42 and 44 are used to determine the degree of misalignment of the shafts 46 and 48, with or without having to rotate the shafts 46 and 48. After information relevant to the misalignment is measured, at least one of the machines is moved, as by loosening its mounting bolts, moving the machine in a horizontal plane, and/or inserting or removing shims under one or more machine feet to set the machine in the vertical plane, all as necessary, to bring the shafts 46 and 48 into an acceptable alignment condition.

The heads 42 and 44 are provided on mounting systems 52 and 54 which are described in detail in the above incorporated patents. Mounting systems 52 and 54 include chain assemblies 56 and 58, and mounting bases 60 and 62. The chain assemblies 56 and 58 provide a means to secure the bases 60 and 62 to the shafts 46 and 48.

The sensor heads 42 and 44 are substantially identical in form and operation, so that head 42 will be described below, wherein the description equally applies to the head 44. Head 42 includes an aperture 64 through which a low power laser beam is emitted. However, head 42 is not limited to a low power laser and accordingly may include any collimated light source having varying power emitting capacities. In a preferred embodiment head 42 includes a laser having a range of about 30 feet. In an alternative embodiment, the laser has a range of about 100 feet. Further, head 42 includes a sensor window 66 through which the laser beam emitted by the opposing head 44 is received. The sensor window 66 provides a window by which the laser beam may strike a photosensitive position detector 98 which is described more fully below. Preferably the sensor window 66 has dimensions of between about 10 mm by about 10 mm. Alternatively, the sensor window 66 may have dimensions of about 20 mm by about 20 mm, or larger. Table 2 lists various light emitting diode (LED) 70 states and the corresponding sensor head 42 functionality and laser activity status. A power switch 68 enables the head 42 when actuated.

TABLE 2

| LED State | System Status | Possible Cause(s) |
|---|---|---|
| Solid Green | System Functioning Properly. | — |
| Flashing Green | Communications In-Process | Communications between the laser head and the analyzer is currently active. |
| Solid Amber | System Warning | Laser beam in non-linear region of the PSD. Laser Head temperature too high. |
| Flashing Amber | Measurement System Error | No Laser Beam Sensed. User rotating head(s) too fast. |
| Solid Red | Serious Error | Low Optical Intensity detected from the laser beam(s). |
| Flashing Red | Critical Error | Laser Over-current. Memory Failure. Internal System Failure. |
| Flashing Amber-Red | Low Battery | The system has detected that the remaining battery power is approaching a critical state. |
| Slow Flash with No Laser | Power Saver Shut-down Mode active. | The system has powered down non-critical subsystems to conserve battery power due to lack of activity. |

Provided on the head 42 is a horizontal aiming adjustor 72 allowing small horizontal adjustments of the aim of the laser through the aperture 64. Further, head 42 includes a vertical aiming adjustor 74, and similarly to the horizontal aiming adjustor 72, allows for small vertical adjustments of the aim of the laser beam. The adjustors 72 and 74 allow the laser beams emanating from the heads 42 and 44 to be aimed so as to fall on the sensor window 66 on each head 42 and 44. In a preferred embodiment of the invention, the head 42 includes a transceiving radio frequency (RF) antenna 76, described more fully below.

Figure 3:
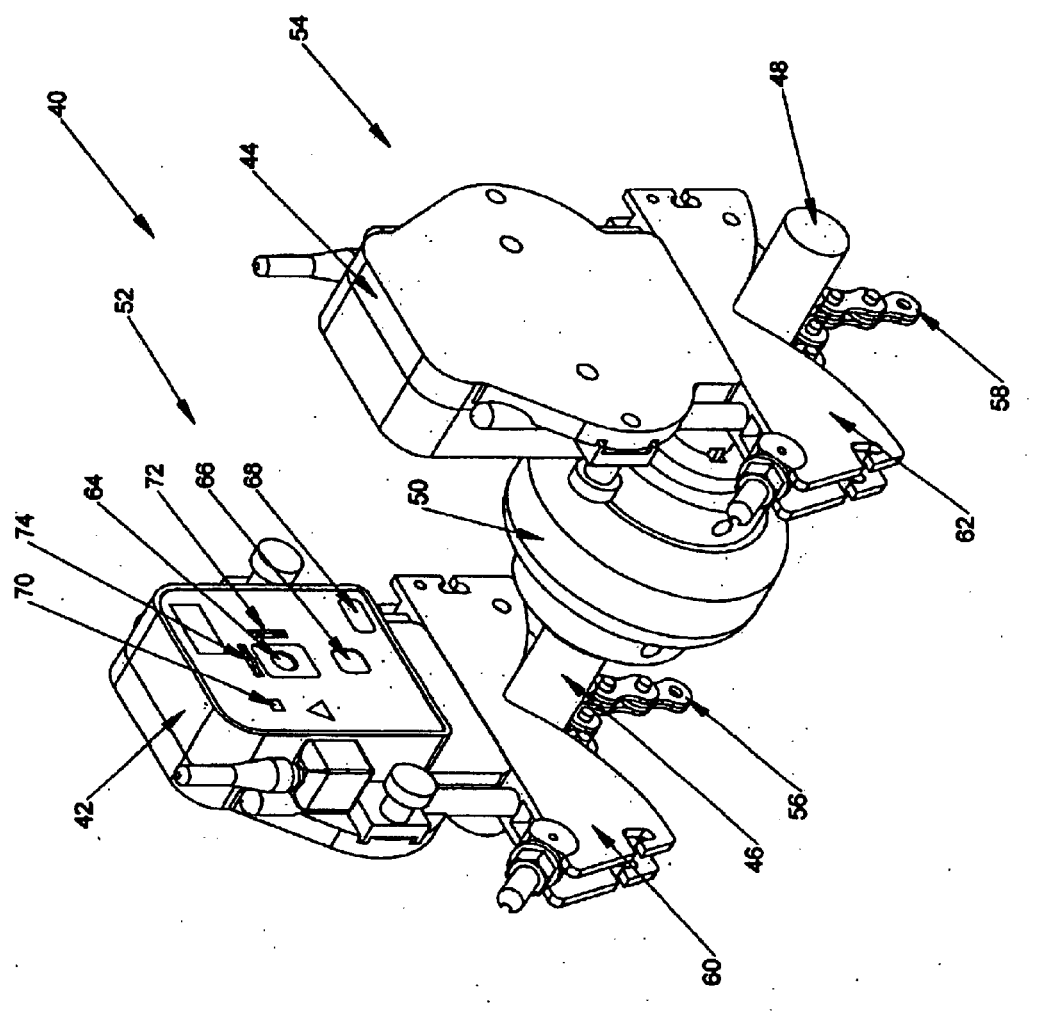
FIG. 3 is a perspective view of a shaft alignment system, according to the invention.
Figure 4:
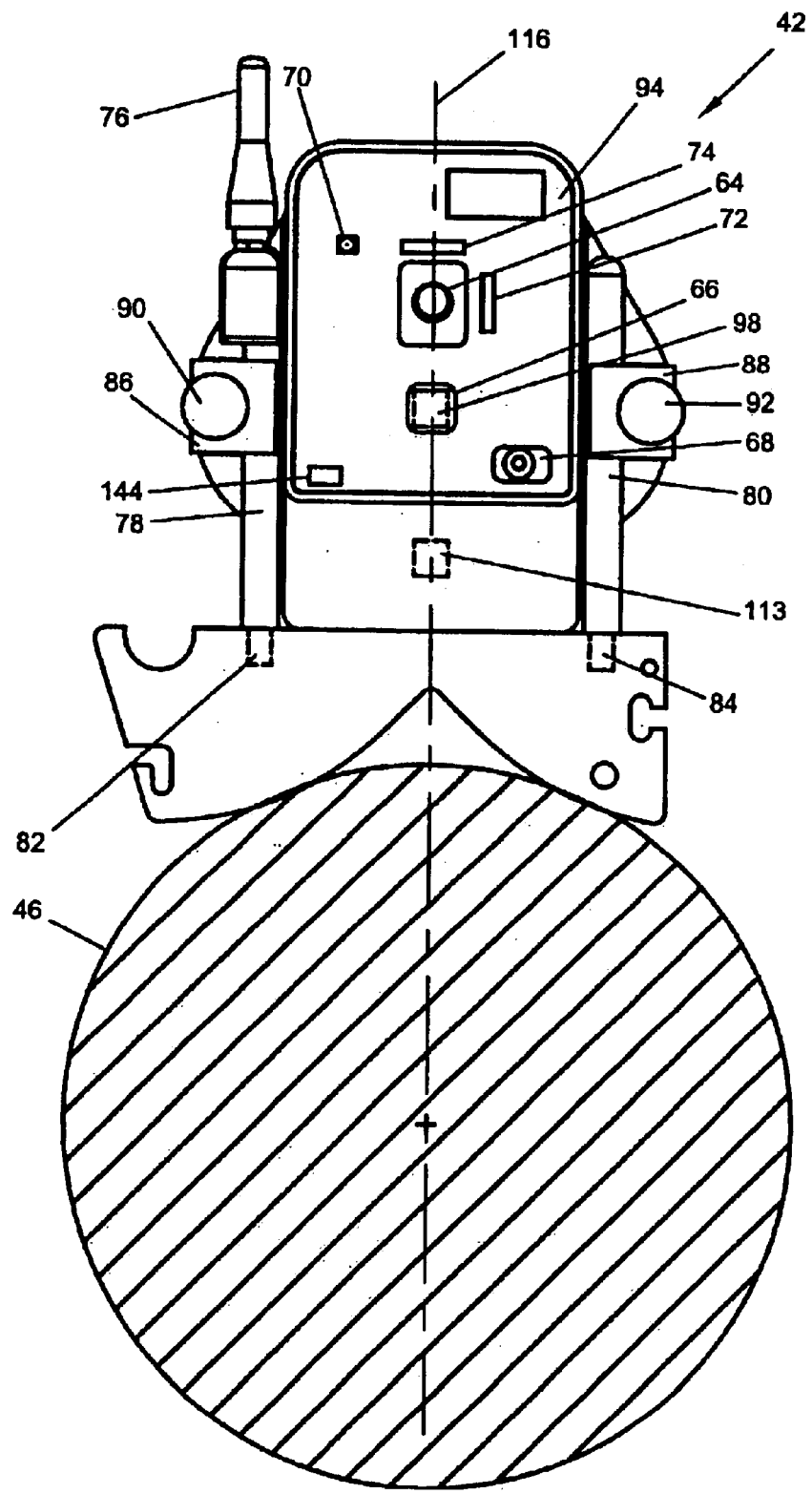
FIG. 4 is a front elevational view of a sensor head, according to the invention.

As best shown in FIG. 4, the head 42 includes mounting posts 78 and 80 which preferably include threaded ends 82 and 84 and are attached to the mounting system 52 for attachment of the head 42. The head 42 also includes split clamps 86 and 88 which fit over the posts 78 and 80. Clamp screws 90 and 92 are provided on the split clamps 86 and 88 to allow the clamps to be tightened on the posts 78 and 80. As described fully in the above incorporated patents, the height of the heads 42 and 44 may be adjusted using the mounting systems 52 and 54 so that they are of approximate equal height with respect to one another (FIG. 3).

Typically, the heads 42 and 44 are positioned at generally the same height above the shafts 46 and 48 by sliding the heads 42 and 44 along the posts 78 and 80 to a desired position and then tightening the split clamp screws 90 and 92. The aiming of the laser beams is then fine tuned using the horizontal and vertical aiming adjustors 72 and 74. Preferably, the perimeter of the sensor window 66 is visible or marked on the laser heads 42 and 44 so that one may aim the beams merely by observing laser radiation on the head housing 94.

Figure 5:
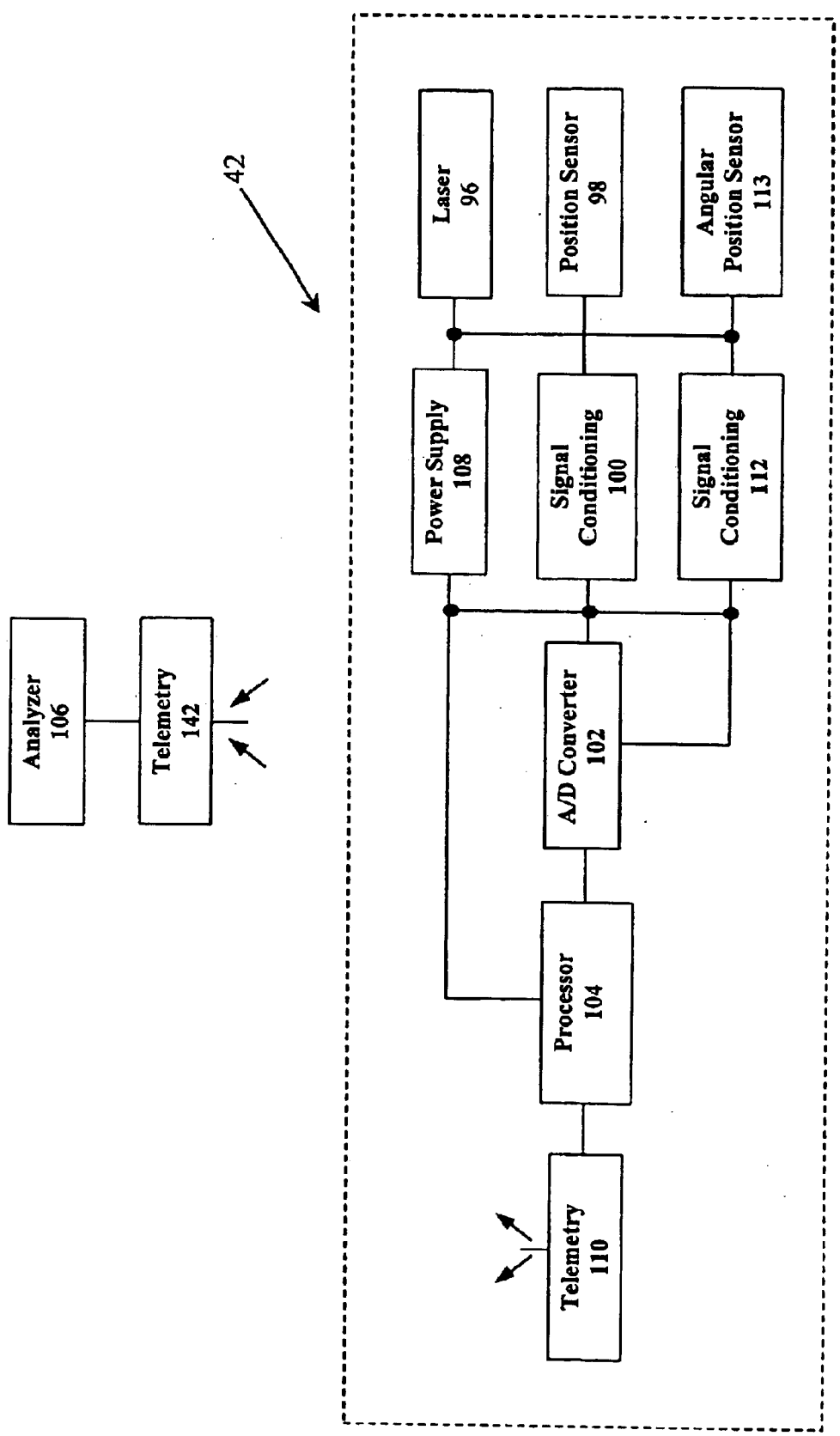
FIG. 5 is a block diagram illustrating the electronics and communications components of the sensor head and alignment analyzer.

Referring now to the block diagram of FIG. 5, a depiction of the electronic components of the shaft alignment system 40 is shown. In particular head 42 contains a laser 96 which generates a laser beam emanating through the aperture 64. The position sensor 98 (photosensitive detector) senses the X and Y coordinates of a laser beam striking the position sensor 98 and generates currents whose ratio corresponds to the coordinates. These coordinates represent the position of the laser beam striking the sensor 98 with respect to the centerline of the shaft 46. The signal conditioner 100 converts the current to voltage and tracks and holds the voltages so that they can be provided to other components of the shaft alignment system 40. Finally, the voltage values are preferably digitized by a 16-bit analog to digital (A/D) converter 102 and the digital position values are provided to the processor 104 for processing of the signals to provide calibrated x and y positions as output to the analyzer 106. Preferably, processor 104 is a MC68HC912 16-bit microprocessor, manufactured by Motorola. However, any general purpose microcontroller may be utilized, such as a standard digital signal processing (DSP) processor.

The power supply 108 provides power to the laser 96, processor 104, A/D converter 102, telemetry unit 110, signal conditioners 100 and 112, and the angular position sensor 113. The power supply 108 may either be operated in a continuous mode by having a switch 70 mounted on the exterior of the head 42 which a user turns on or may be selectively controlled by the processor 104 only when desired. When controlled by the processor 104, the laser 96 can be turned on only when data needs to be taken, thus minimizing power usage by the system 40. Preferably, the laser 96 is pulsed at about 600 Hertz, pertaining to an even multiple of either 50 Hertz or 60 Hertz. Accordingly, by averaging 30 pulses in 1/10 sec, the invention is operable to average over an integral number of American or European line cycles, which correspondingly improves the laser position stability of the photosensitive detector, therefore improving the system response to ambient light noise effects.

According to the invention, additional data is generated by the angular position sensor 113. The angular position sensor 113 determines the angular position of the head 42 or, more particularly, the angular position of the position sensor 98. As described in the above referenced patents, the angular position of the head 42 at a plurality of angles must be known in addition to the change in position of the laser beam for each positional measurement. The angular position sensor 113 generates signals which are proportional to the acceleration due to gravity exerted on the angular position sensor 113 as it is rotated with the head 42. The signals generated by the angular position sensor 113 are conditioned by the signal conditioner 112 (which may be incorporated into the angular position sensor 113, as described above) and digitized by the A/D converter 102 before being sent to the microprocessor 104 for further processing, described in more detail below. It is important to understand that the signal conditioning and processing features according to this embodiment of the angular position sensor 113 are not limited to shaft alignment systems, but may be used to determine the angular position of a rotatable body as the body is moved through a plurality of angular orientations.

Figure 6:
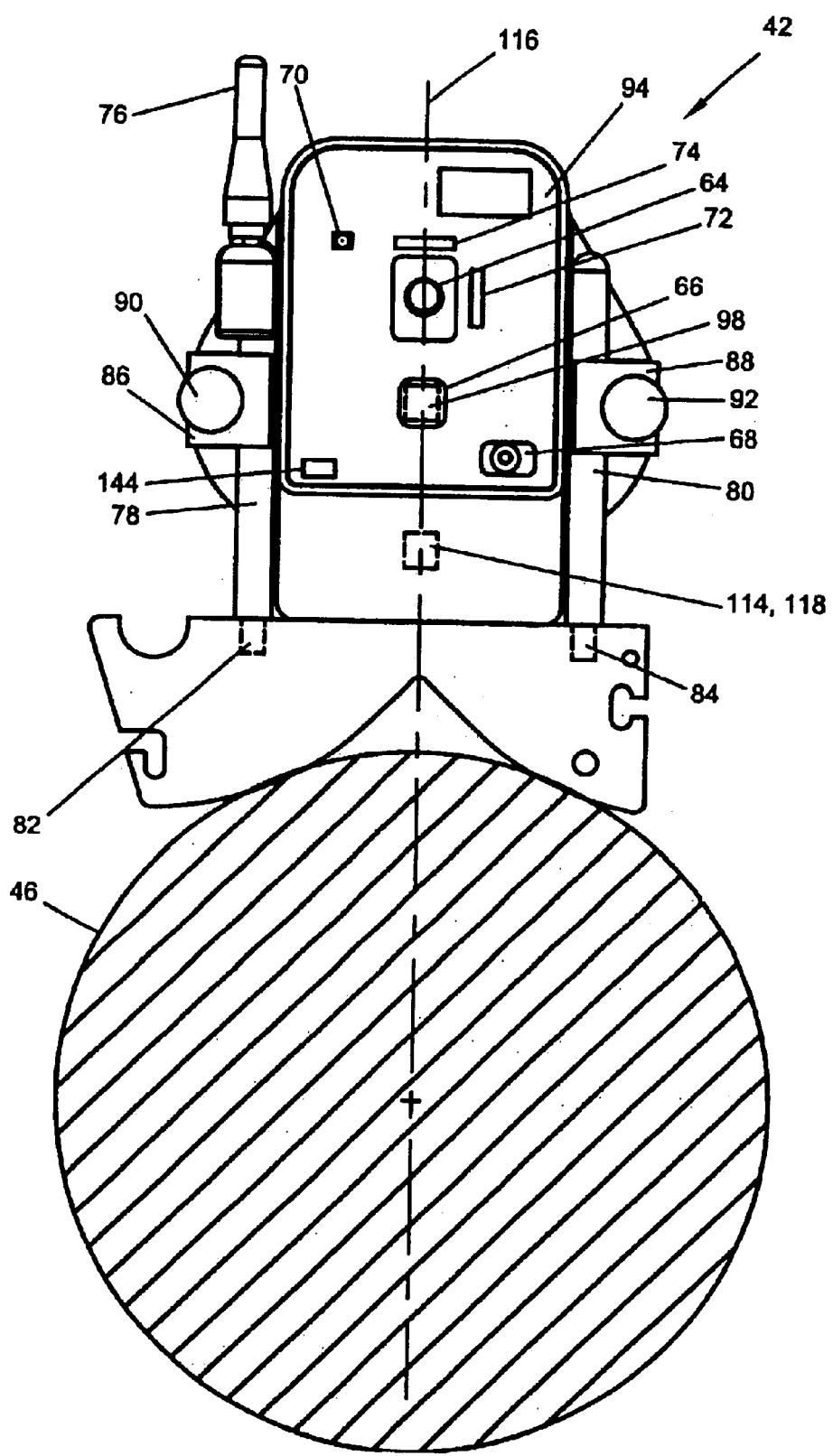
FIG. 6 is a front elevational view of a sensor head, according to first and second embodiments of the invention.

According to the invention, it is possible to obtain the angular position of the head 42 by using an accelerometer based angular position sensor 113. In the first embodiment of an angular position sensor 114 used in a shaft alignment system 40, an angular position sensor 114 is described utilizing a single-axis accelerometer to determine the angular position of the head 42 at various angular positions about the shaft 46 (FIG. 6). Preferably, the single-axis accelerometer based angular position sensor 114 is located within the head housing 94, generally aligned along an axis, referred in FIG. 6 as line 116, which is generally perpendicularly oriented with respect to a tangential portion of the shaft 46.

Figure 7:
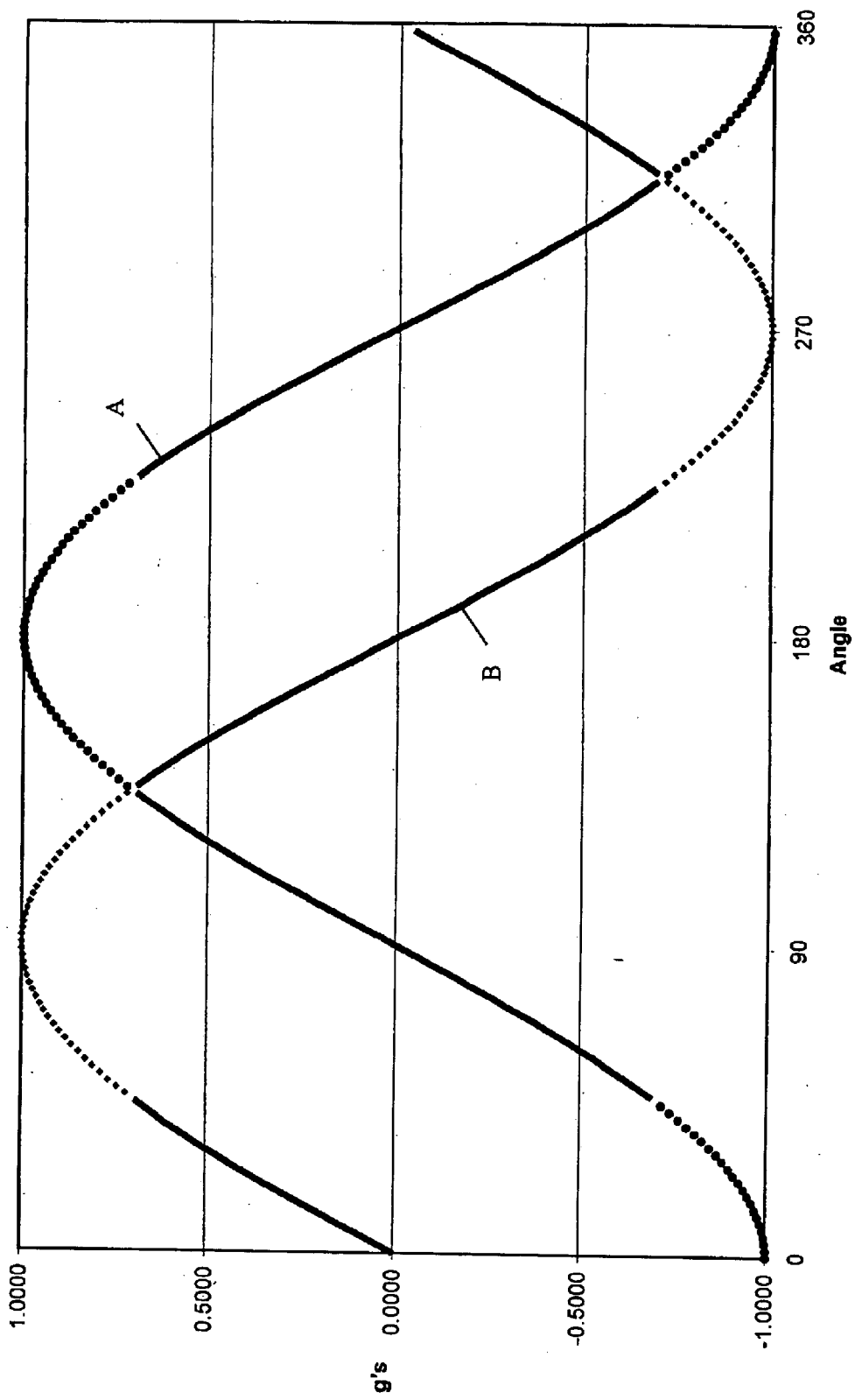
FIG. 7 is a graph depicting the output of an accelerometer based angular position sensor, according to the invention.

As the shaft 46 or the head 42 is rotated through a plurality of angular orientations, the single-axis accelerometer based angular position sensor 114 produces a voltage signal which is influenced by gravity according to the rotational position of the head 42. With additional reference to FIG. 7, a depiction of a representative signal produced by a single-axis accelerometer based angular position sensor 114 as the sensor 114 is rotated from 0° through 360° (a full head rotation) is shown (curve A). The vertical axis depicted in FIG. 7 represents the amplitude of the signal produced by the angular position sensor 114, and the horizontal axis represents the angular position of the angular position sensor 114 from 0° to 360°. At 0°, the angular position sensor 114 produces an output signal proportional to about −1 g, assuming a substantially parallel orientation of the angular position sensor 114 with respect to the line 116 at the 0° position. As the angular position sensor 114 is rotated with the head 42 away from 0°, the amplitude of the output signal decreases since the angular position sensor's sensing axis is becoming more perpendicular with respect to the acceleration due to gravity. At 90°, the signal output by the angular position sensor 114 is approximately zero since the angular position sensor 114 axis is substantially perpendicular with respect to gravity. At 180°, the signal is proportional to about +1 g and at 270° the signal is approximately zero. Since the single axis angular position sensor 114 cannot distinguish between 90° and 270', it will be appreciated that the output of the angular position sensor 114 does not identify a single angular position. Thus, when using the single-axis accelerometer based angular position sensor 114, the user must be mindful of the direction of rotation and interpret the measurements accordingly.

The ambiguity of the output of the single-axis accelerometer based angular position sensor 114 may be resolved in a number of ways. For example, the processor 104 may be programmed to assume a default rotation direction and assume continuous or progressive rotation in that direction. The processor 104 may be further programmed to allow a user to change the default direction, or the processor 104 may be programmed to present two alternative angles and allow the user to select one. The user's selection is used to orient the processor 104 as to the direction of rotation.

Accordingly, it is possible to determine the angular position of the head 42 with the single-axis accelerometer based angular position sensor 114. However, there are a few limitations associated with using a single, single-axis angular position sensor 114. First, referring again to FIG. 7, the greatest amount of sensitivity of the angular position sensor 114 is seen in the areas of maximum slope of the sine wave curve A. Correspondingly, the greatest sensitivity of the angular position sensor 114 is seen in the range from about 45° to about 135°, and from about 225° to about 315°, and periodic increments thereof.

Therefore, the single-axis accelerometer type angular position sensor 114 provides maximal resolution within the above listed ranges. For the ranges from about 0° to about 45° and from about 135° to about 225° and from about 315° to about 360°, the obtainable resolution is limited by the electromechanical properties of the angular position sensor 114.

While it is possible to obtain an angular reading at these latter locations, the diminished resolution may tend to result in less than ideal readings. Second, if it is desired to take dynamic angular measurements, that is, while the head 42 or shaft 46 is rotated, the associated angular acceleration and centrifugal acceleration values or errors should be taken into account to obtain an accurate angular measurement. It is possible to calculate these acceleration values for a particular rotation rate and include them in the determination of the head angle, however this adds an additional level of complexity to the microprocessing feature of the system. Further, any non-uniform rotation of the head 42 may be difficult to account for without additional microprocessing features.

Referring again to FIG. 6, the first limitation of the single-axis accelerometer based angular position sensor 114 is overcome using a dual-axis accelerometer based angular position sensor 118. The angular position sensor 118 preferably has one sensing axis generally aligned with line 116, and the other sensing axis is perpendicular thereto (ie. a radial and a tangential axis). Referring again to FIG. 7, the A-curve represents the output signal corresponding to the first axis and the B-curve represents the output signal corresponding to the second axis of the angular position sensor 118 as the head 42 is rotated through various angular positions. Based on the orthogonal relation between the radial and tangential axes of the angular position sensor 118 (90° relative phase relationship), it is possible to utilize the axis having the greatest resolution according to the angular position of head 42.

For example, between 0° and 45° (curve A of FIG. 7) the first axis of the angular position sensor 118 has a limited resolution and accordingly may tend to provide an erroneous angular reading as described above. However, in this same range, the second axis of the angular position sensor 118 has its maximal resolution and is operable to provide a highly accurate angular reading (curve B). Therefore, preferably, the processor 104 (FIG. 5) chooses and utilizes the particular sensing axis having the best resolution according to the angular position of the angular position sensor 118, based on the physical relationship of the two sensing axes. More specifically, the processor 104 uses the sensing axis having the greatest resolution for determining the head 42 and associated laser sensor angular position based on the current head position. It should be noted that the first two embodiments of the invention require calibration of the accelerometer based angular position sensors 114 and 118, so that accurate angular measurements may be obtained. Even though it is possible to obtain accurate angular position readings from the dual-axis accelerometer based angular position sensor 118, the sensor 118 is also susceptible to dynamic errors, namely angular acceleration and centrifugal acceleration errors, as described above for the single-axis accelerometer based angular position sensor 114.

Figure 8:
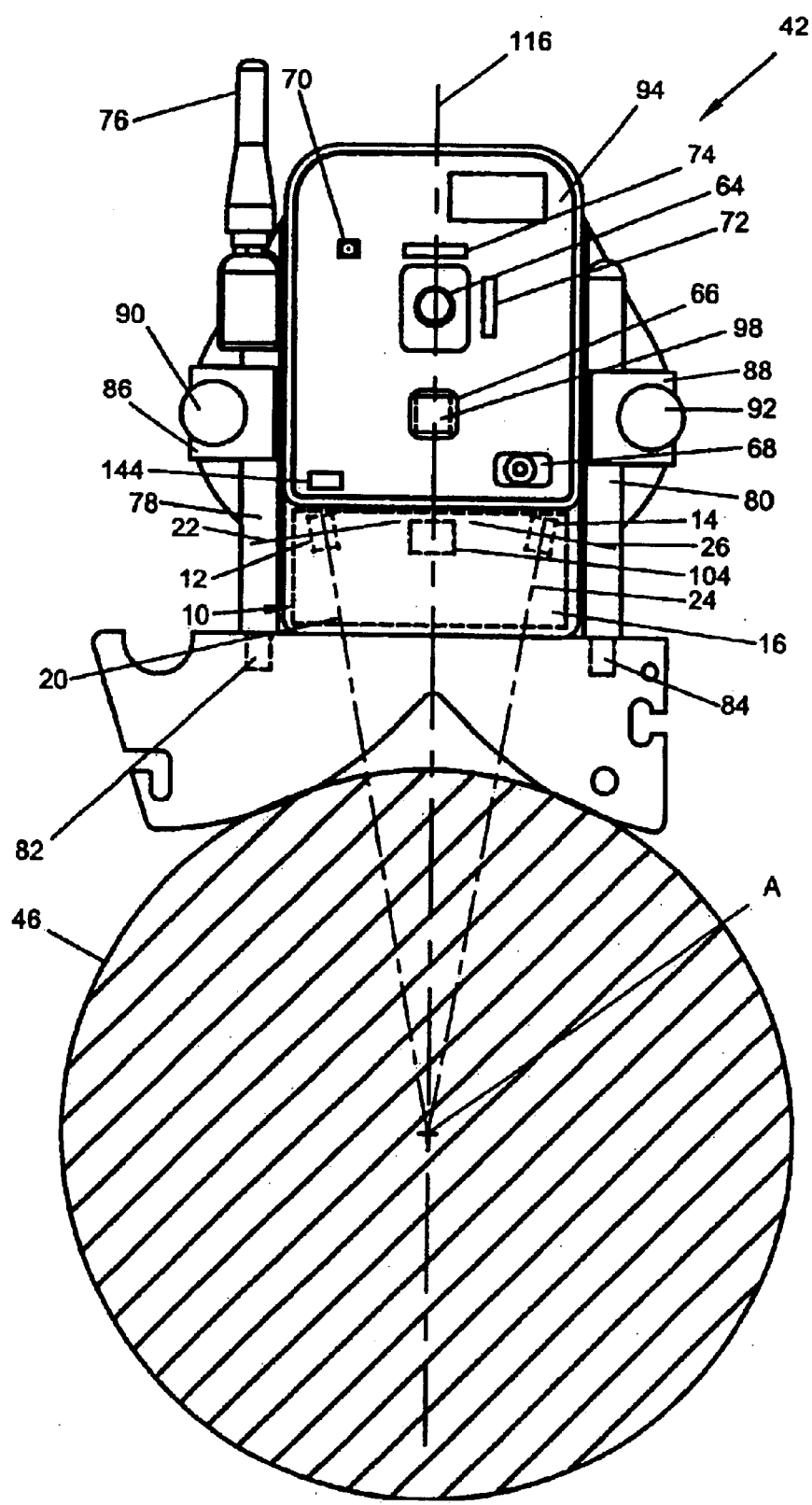
FIG. 8 is a front elevational view of a sensor head, according to a preferred embodiment of the invention.
Figure 9A:
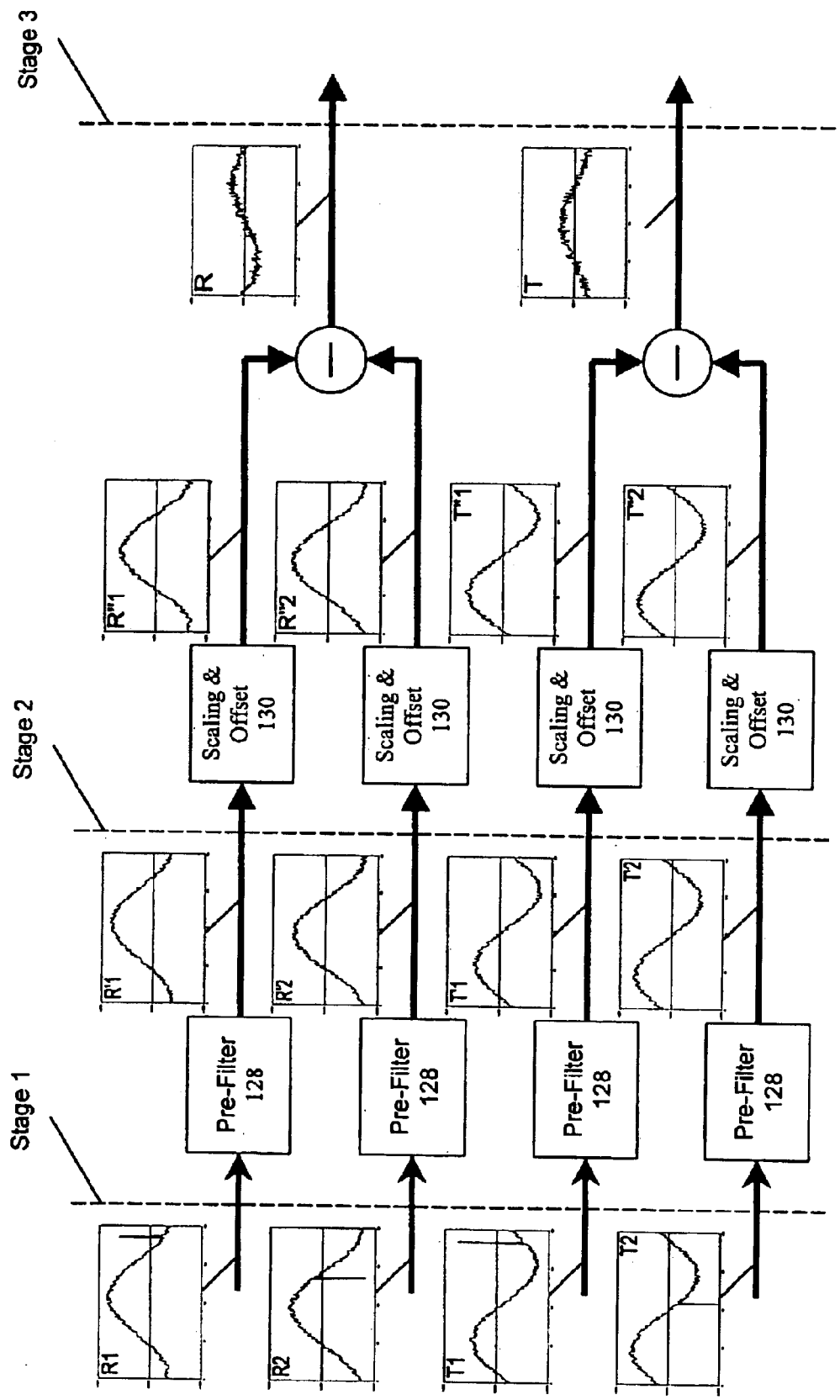
FIGS. 9a and 9b is a block diagram illustrating the angle determination firmware of the microprocessor in the sensor head, according to the invention; and, FIGS. 10a and 10b are signal representations of angular data, according to the invention.
Figure 9B:
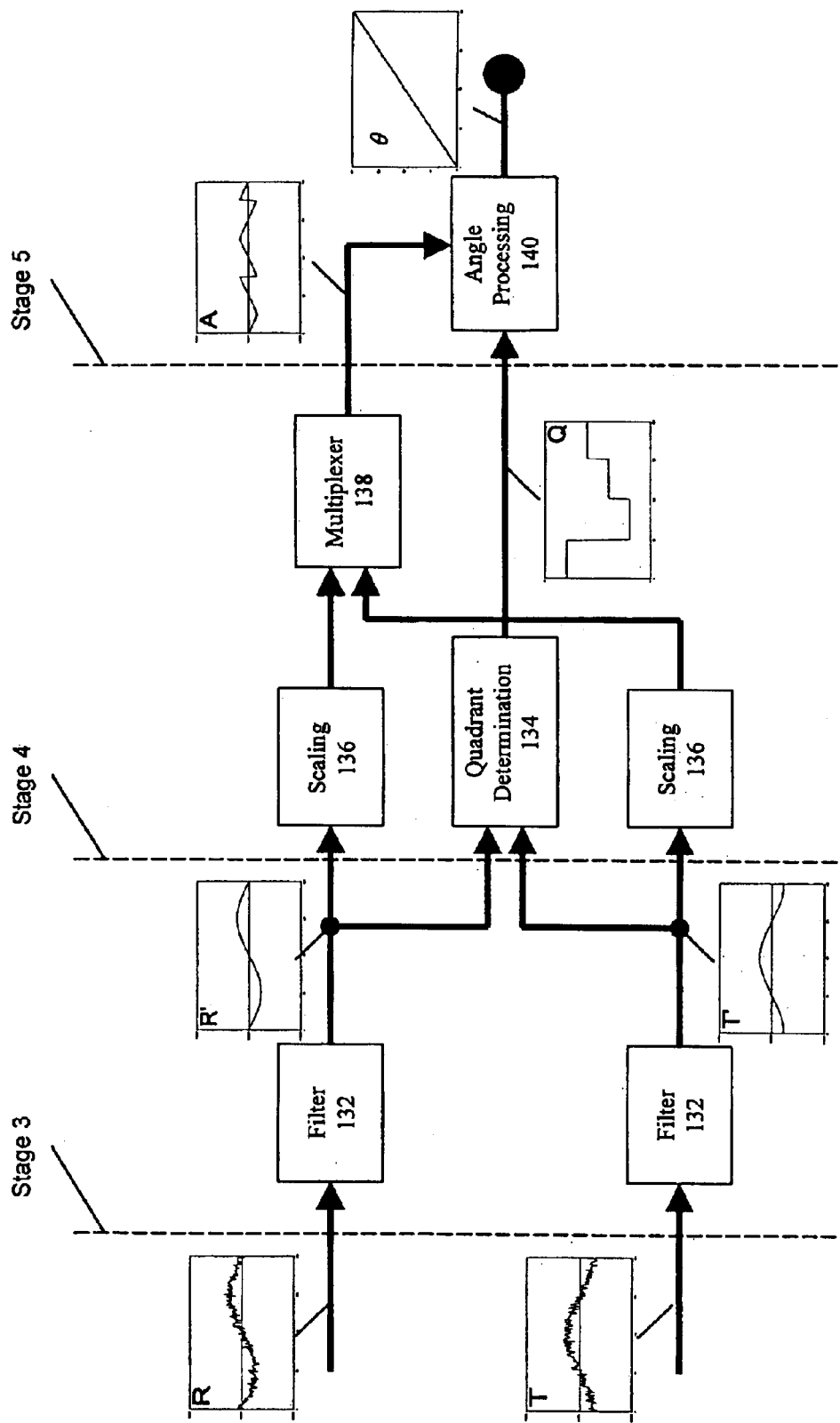

Referring now again FIGS. 1–3, 5 and 7, and with additional reference to FIGS. 8, 9a and 9b, and the above description of the dual dual-axis accelerometer based angular position sensor 10, a preferred embodiment of the invention is described. As best shown in FIG. 8, the sensor head 42 includes angular position sensor 10 including two dual-axis accelerometers 12 and 14 contained on the printed circuit board 16 within the head housing 94. The axes represented by lines 20, 22, 24 and 26 represent radial and tangential sensing axes for the angular position sensor 10, and as shown the intersection of axes 20 and 24 coincide with the shaft center.

The sensing axes 20 and 24 preferably intersect at the center of rotation of each dual-axis accelerometer 12 and 14, respectively. As described above, the rotational orientation and relative displacement of the dual-axis accelerometers 12 and 14 determines the position of a point A, which preferably coincides with the center of rotation of the head 42. It is preferred that each dual-axis accelerometer sensor 12 and 14 be symmetrically angled and spaced apart or mirrored with respect to each other within a range of between about −60° to about +60° with respect to the line 116, wherein −60° is a counterclockwise orientation with respect to line 116, and +60° is a clockwise orientation with respect to line 116.

Preferably, the first dual-axis accelerometer 12 is angled at about −10° with respect to line 116, the axis 20 preferably oriented substantially in a direction intersecting the center of rotation of the head 42. Correspondingly, the second dual-axis accelerometer 14 is preferably angled at about +10° with respect to line 116, the axis 24 preferably oriented substantially in a direction intersecting the center of rotation of the head 42. Accordingly, it is preferred that the dual-axis accelerometers 12 and 14 be oriented in a substantially symmetric configuration, as shown in FIGS. 1 and 8. Accordingly, as a result of this unique configuration of the dual-axis accelerometers 12 and 14, it is possible to not only achieve dynamic angular position measurements of the head 42, but the configuration also allows the resulting angular and centrifugal acceleration errors to be greatly diminished, if not totally cancelled, as described more fully below.

Preferably, as described above, the angular position sensor 10 incorporates the ADXL202 model for each dual-axis accelerometer 12 and 14. The ADXL202 is fully integrated on its own silicon chip. As described above, the ADXL202 includes signal conditioning and pulse width modulation capabilities. In operation, just as in the prior embodiments, it is important to calibrate the angular position sensor 10 before taking any substantive measurements. For an angular position sensor 10 utilizing dual-axis accelerometers having an accelerometer range of about +/−2 g and a desired digital scaling of 32767 analog to digital (A/D) conversion counts per 2 g, the calibration is performed to generate coefficients for each of the raw accelerometer signals that will produce the full range of 2 g's. Preferably, the 2 g full range corresponds to equal 32767 A/D conversion counts.

As an example, calibrating an angular position sensor 10 having the dual-axis accelerometers 12 and 14 mounted on the printed circuit board 16 with sensing axis 20 at a −10 degree orientation with respect to the line 116, and sensing axis 24 at a +10 degree orientation with respect to line 116 is described. To aid the reader, negative angles correspond to counterclockwise rotations relative to line 116, and positive angles correspond to clockwise rotations relative to line 116. Correspondingly, the calibration is initiated by moving each head 42 and 44 between positions of about 0° to about 20°, of about 70° to about 110°, of about 160° to about 200°, of about 250° to about 290°, and of about 340° to about 360°, in one degree increments for each range. At each of these incremental positions, the dual-axis signals produced by each dual-axis accelerometer 12 and 14 are processed to acquire the maximum and minimum amplitude signals for each of these positions. From these maximum and minimum signal values, the coefficients for offset and scaling are calculated as follows:

Offset=(Maximum Value+Minimum Value)/2

Scaling=327681(Maximum Value−Minimum Value)

These coefficients are used by the microprocessor 104 for scaling and offsetting the digital signals (stage 2, shown in FIG. 9a), described more fully below. According to the invention, the specific calibration reading positions are design specific and may vary depending on the particular angular position sensor configuration. Moreover, the above calculations are based on specific system design constraints which may change for different accelerometers, A/D converters, and/or microprocessors.

Each dual-axis accelerometer 12 and 14 is operable to provide a radial signal, herein $A_{R1}$ and $A_{R2}$, and a tangential signal $A_{T1}$, and $A_{T2}$, respectively. The radial and tangential signals $A_{R1}$, $A_{R2}$, $A_{T1}$, and $A_{T2}$ are proportional to the radial and tangential accelerations applied to the angular position sensor 10 due to the rotation of the head 42 and due to gravity. The radial signals $A_{R1}$ and $A_{R2}$ produced by the dual-axis accelerometers 12 and 14 are defined as the signals which generally correspond to the applied acceleration sensed along the sensing axes 20 and 24, respectively. Similarly, the tangential signals $A_{T1}$ and $A_{T2}$ produced by the dual-axis accelerometers 12 and 14 are defined as the signals which generally correspond to the applied acceleration sensed along the sensing axes 22 and 26, respectively. Herein, the subscript designated 1 refers to signals provided by the dual-axis accelerometer 12 and subscript 2 refers to signals provided by the dual-axis accelerometer 14.

The analog signal conditioning circuit 112 provides amplification, adjustment for offset, and low-pass filtering to each of the four analog signals $A_{R1}$, $A_{R2}$, $A_{T1}$, and $A_{T2}$. The signal conditioning circuit 112 further includes an analog multiplexer which sequentially presents the different analog signals, $A_{R1}$, $A_{R2}$, $A_{T1}$, and $A_{T2}$, to the A/D converter 102, converting the analog signals to digitized signals, R1, R2, T1, and T2 (FIG. 9a), preferably based on a sequence generated by a programmable logic device (PLD) included in the signal conditioning circuit 112. As described below, the digitized signals R1, R2, T1, and T2 are read by the microprocessor 104 from the A/D converter 102 for further processing. It should be noted that the signal conditioning circuit 112 is not to be construed as limited to the above described components, and it is recognized that a variety of signal conditioning techniques are available to provide signal conditioning functions to the analog signals $A_{R1}$, $A_{R2}$, $A_{T1}$, and $A_{T2}$.

Referring now to FIGS. 9a and 9b, the processing of the digitized signals R1, R2, T1, and T2 within the microprocessor 104 to determine the head angular position θ, is described. The dashed lines in FIGS. 9a and 9b designate signal processing stages and are not intended to limit the invention in any way, but are provided for reference purposes only. Furthermore, the signal representations at each stage are intended to aid the reader to better understand the invention. It should also be noted that the stages described herein are a preferred embodiment of the present invention and there are other signal processing methods available which may be incorporated herein. For example, the processing within the microprocessor may be accomplished utilizing software, hardware, or a combination of the two.

In a preferred embodiment of the invention, at stage 1 the digitized signals R1, R2, T1, and T2 are pre-filtered in the pre-filter modules 128, producing signals R'1, R'2, T'1, and T'2. The pre-filter modules operate to eliminate any spikes from the sample streams. These spikes may be due to sudden physical shock to the system or to electrical noise in the environment or any ambient vibration. Referring to FIGS. 10a and 10b, the pre-filters detect any spikes by comparing each sampled signal to the characteristics of the pre- and post-samples around the sampled signal. In a preferred embodiment, the data sample is compared to the average of the two pre-samples and the two post-samples (total of four samples in the average). If the data sample is outside of a tolerance band around this average (for example ±10%) then the sample is rejected and is not used in the subsequent calculation of the angle (FIG. 10a). If the signal falls within this tolerance band (FIG. 10b), then the angle is calculated using this data value. It should be noted that this preferred embodiment requires that the digitized sample stream be pre-sampled by two in order to achieve the two post-samples in the average. Another embodiment may use only pre-samples that would eliminate this restriction, but may not provide the best spike rejection. It should also be noted that the number of samples in the average is not restricted to 4. If the data stream is excessively noisy a larger sample size in the average will improve the noise rejection. It should also be noted that other methods of comparing the sample to the surrounding samples may be used including risetime, spectrum, etc.

Referring again to FIGS. 9a and 9b, at stage 2 the pre-filtered signals are adjusted for scaling and offset in the calibration modules 130 according to the calculated calibration values, as described above. The calibration at stage 2 is a linear operation ensuring that the signals R"1, R"2, T"1, and T"2 have a maximum signal value of +1 g equivalent voltage and a minimum value of −1 g equivalent voltage and that are centered around zero. During Stage 2, the radial signals and the tangential signals, R"1, R"2, T"1, and T"2, from the two accelerometers are subtracted from each other to produce a radial (R) and a tangential (T) signal, thereby compensating for centrifugal acceleration and angular acceleration. Preferably, the accelerometers are located on the same radius from the center of rotation and the accelerometer axes lie on a vector that passes through the center of rotation, causing the accelerometers to experience the same centrifugal acceleration and angular acceleration. By subtracting these signals from one another, the centrifugal acceleration and angular acceleration errors are eliminated from the measurement signal. Correspondingly, by eliminating the centrifugal acceleration and angular acceleration signals, the invention is operable to make static and dynamic measurements of angular position.

According to the invention, and the symmetric configuration of the dual-axis accelerometers 12 and 14 on the printed circuit board 16, any common mode acceleration errors, namely centrifugal and angular, are removed from the signals before entering stage 3, leaving only the acceleration due to the influence of gravity in the radial and tangential directions. In Stage 3 the compensated radial and tangential accelerometer readings are filtered to remove any noise from the signals. Preferably, the difference signals are processed through finite impulse response (FIR) filters 132. A preferred characteristic list for the finite impulse response filters 132 is provided in Table 3.

TABLE 3

| | |
|---|---|
| Sampling Frequency | About 300 Hz |
| Passband Frequency | About 2 Hz |
| Passband Ripple | about 0.01 decibels |
| Stopband Frequency | about 8 Hz |

TABLE 3-continued

| | |
|---|---|
| Stopband Ripple | about 25.0 decibels |
| Windowing Function | Kaiser |

However, it should be emphasized that other possibilities exist for the characteristics of the finite impulse response filters 132 dependent on the specific application and components of the angular position sensor 10, and accordingly the invention is not intended to be limited by the filter characteristics detailed in Table 3.

As described above, at stage 1, the sensor signals R1, R2, T1, and T2 are scanned for noise spikes before the scaling and offset occurs. For a different filter implementation in stage 3, stage 1 may become unnecessary due to the characteristics of the substituted filter. More particularly, the above described finite impulse response filter 132 averages the power of the incoming signals over the finite impulse response filter coefficients. Accordingly, any noise spikes will concomitantly map to the transfer function of the finite impulse response filter and may tend to generate erroneous results. Therefore, stage 1 is implementation specific for the specific utilization of the finite impulse response filters 132 in stage 3, according to a preferred embodiment of the invention.

The filtered signals from Stage 3 are scaled in Stage 4 to improve the resolution of the angle calculation later in Stage 5. The signals are also processed by a quadrant determination module 134 to determine where the head 42 is located within a range of 0-360°. Preferably, the quadrants range from about 0–90°, about 90–180°, about 180–270° and about 270–360°. The quadrant determination module 212 determines the proper head quadrant location by examining the signs of the filtered signals R' and T'. Table 3 lists the preferred quadrant determination selection performed by the quadrant determination module 134.

TABLE 4

| R' sign | T' sign | Quadrant |
|---|---|---|
| − | + | 0–90° |
| + | + | 90–180° |
| + | − | 180–270° |
| − | − | 270–360° |

For example, if both signals, R' and T', are positive, the quadrant determination module 134 determines that the head 42 is located in the 90–180° quadrant. Likewise, if R' is negative and T' is positive, the quadrant determination module 134 determines that the head 42 is located in the 0–90° quadrant. The quadrant determination module 134 outputs the quadrant determination to the angle processing module 140 in stage 5 for further processing, as described below.

In stage 4, the scaled signals produced by the scaling modules 214 are input to the multiplexer 138. According to the invention, the filtered signals, R' and T' each map a curve in substantial relation to a sine wave curve. Accordingly, as described above, it is preferred to use the particular sine curve that generates an angle within the linear region of the sine curve. In the preferred embodiment of the invention, and before entering Stage 5, the microprocessor 104 implements the multiplexer 138 of Stage 4 to output the signal, R' or T', which will generate an angle less than about 45° within its particular quadrant, thereby utilizing the linear region of the particular sine curve.

Upon entering stage 5, the microprocessor 104 implements the angle processing module 140 to calculate the arcsine of the signal output from the multiplexer 138 of stage 4, providing an angle. Utilizing the head quadrant location determined by the quadrant determination module 134, the resulting angle is adjusted for the particular quadrant. This latter step is necessary since the invention is constraining the angle calculation to the linear portion of the sine curve of between about 0° to about 45° to generate the final head angle θ. As an example, if the quadrant determination module 134 determines that the head 42 is in the 180–270° quadrant and the arcsine calculation determines an angle of 35°, accordingly, the angle processing module 140 will add 180° to 35°, to obtain the proper head angle θ, in this example, equal to 215°. The determination of the head angle θ is not limited to the above described preferred embodiment, and it is understood that there are other methods of calculating the head angle θ.

As per the above description, the following description refers to head 42, but is equally applicable to head 44. The processor 104 processes the radial position information and the corresponding rotational position information, typically using the calibration values stored on board and storing the values in temporary memory, providing the processed data to the telemetry unit 110. The telemetry unit 110 then transmits the data to a second telemetry unit 142 which provides the data to a shaft alignment analyzer 106, such as the ULTRASPEC® 8117 series shaft alignment analyzer manufactured by CSI, Inc., of Knoxville, Tenn. The analyzer 106 receives the data, calculates the misalignment in the shaft based on the data and determines how the feet of the machines need to be adjusted in order to achieve optimal shaft alignment.

The analyzer 106 represents input ports and a computer, which is programmed to calculate misalignment based on provided input, plus a keyboard and display. In a typical conventional alignment calculator, input (e.g. angle and displacement) is provided through a keyboard. In contrast, analyzer 106 receives the same or similar input automatically through an input port. The analyzer 106 is programmed with an automatic mode to automatically acquire data as the shafts 46 and 48 are slowly rotated and is further programmed with manual mode to acquire data when the user instructs the analyzer 106 using the keyboard. The user selects either the automatic or manual mode of data acquisition.

Preferably, the telemetry to and from the analyzer 106 and heads 42 and 44 is accomplished utilizing radio frequency (RF) transmissions via the transceiving RF antenna 76 (FIGS. 3 and 8). An RF transmission system allows the telemetry to be transmitted and received over short to long distances. Alternatively, an infrared type telemetry system may be used for telemetry transmissions over relatively short distances. Further, although the wireless communication of the disclosed telemetry units makes data gathering easier since there are no wires to get tangled when the shafts 46 and 48, or heads 42 and 44 are rotated, a wire or cable may be attached at port 144 on the head housing 94 and may be used in place of the telemetry units to transfer data from the head 42 to the analyzer 106.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims. For example, an angular position sensor having two single axis accelerometers located in spaced apart relation could be utilized to account for one of the dynamic error sources, namely angular or centrifugal acceleration errors, providing a rotational position measurement for the head 42 orientation. Alternatively, it is possible to utilize an angular position sensor having four single-axis accelerometers in place of the dual-axis accelerometers 12 and 14. Furthermore, the shaft alignment system 12 may utilize an angular position sensor having at least one and preferably two tri-axis accelerometers for determining the angular position of the head 42 at various spatial orientations.

What is claimed is:

1. An alignment system for aligning a centerline of a first shaft with a centerline of a second shaft comprising:
   an analyzer having memory,
   a mounting bracket having engagement surfaces for engaging the first shaft and securing the bracket to the first shaft,
   a sensor head having a facing surface and a rear surface in opposing relation disposed on the mounting bracket and extending in a substantially perpendicular orientation with respect to the centerline of the first shaft,
   a collimated light source mounted on the sensor head for transmitting a beam of energy in a direction that is substantially parallel to the first shaft,
   a photosensitive sensor mounted on the sensor head for sensing light and generating a position signal corresponding to a position of a light beam impinging upon the photosensitive sensor,
   at least one accelerometer mounted on the sensor head for generating a signal corresponding to the angular orientation of the sensor head with respect to the first shaft, and
   a microprocessor for processing the signal generated by the at least one accelerometer, operable to provide an output corresponding to the angular position of the sensor head relative to the first shaft.

2. An alignment system for aligning a centerline of a first shaft with a centerline of a second shaft comprising:
   an analyzer having memory,
   a mounting bracket having engagement surfaces for engaging the first shaft and securing the bracket to the first shaft,
   a sensor head having a facing surface and a rear surface in opposing relation disposed on the mounting bracket and extending in a substantially perpendicular orientation with respect to the centerline of the first shaft,
   a collimated light source mounted on the sensor head for transmitting a beam of energy in a direction that is substantially parallel to the first shaft,
   a photosensitive sensor mounted on the sensor head for sensing light and generating a position signal corresponding to a position of a light beam impinging upon the photosensitive sensor,
   at least one accelerometer for generating a signal corresponding to the angular orientation of the sensor head with respect to the first shaft, and
   a microprocessor for processing the signal generated by the at least one accelerometer, wherein the microprocessor further comprises an angle processing module for determining a current head quadrant location and determining the angular position of the sensor head based in part on the quadrant location, the microprocessor providing an output corresponding to the angular position of the sensor head relative to the first shaft.

3. The angular position sensing apparatus of claim 2, wherein the at least one accelerometer is a single-axis accelerometer for generating a signal proportional to the angular orientation of the sensor head.

4. The angular position sensing apparatus of claim 2, wherein the at least one accelerometer is a dual-axis accelerometer having a radial and a tangential axis, for generating radial and tangential signals proportional to the angular orientation of the sensor head.

5. An alignment system for aligning a centerline of a first shaft with a centerline of a second shaft comprising:
   an analyzer having memory,
   a mounting bracket having engagement surfaces for engaging, the first shaft and securing the bracket to the first shy
   a sensor head having a facing surface and a rear surface in opposing relation disposed on the mounting bracket and extending in a substantial perpendicular orientation with respect to the centerline of the first shaft,
   a collimated light source mounted on the sensor head for transmitting a beam of energy in a direction that is substantially parallel to the first shaft,
   a photosensitive sensor mounted on the sensor head for sensing light and generating a position signal corresponding to a position of a light beam impinging upon the photosensitive sensor,
   a first dual-axis accelerometer having a first sensing axis for sensing a first acceleration component and a second sensing axis for sensing a second acceleration component, wherein the first and second sensing axes are in substantially perpendicular relation, the first dual-axis accelerometer operable to output a first signal proportional to the sensed first acceleration component and to output a second signal proportional to the sensed second acceleration component,
   a second dual-axis accelerometer having a third sensing axis for sensing a third acceleration component and a fourth sensing axis for sensing a fourth acceleration component, wherein the third and fourth sensing axes are in substantially perpendicular relation, the second dual-axis accelerometer operable to output a third signal proportional to the sensed third acceleration component and to output a fourth signal proportional to the sensed fourth acceleration component, the first and second dual-axis accelerometers mounted in spaced apart relation defining a plane of reference, and
   a microprocessor for processing the signals generated by the first and second dual-axis accelerometers, operable to provide an output corresponding to the angular position of the sensor head relative to the first shaft.

6. The apparatus of claim 5, wherein the microprocessor is operable to determine the angular position of the sensor head as the sensor head rotates through a plurality of angular positions about the first shaft by selecting a fifth signal dependent on the first and third signals or a sixth signal dependent on the second and fourth signals and determining the angular position of the rotatable body therefrom.

7. The angular position sensing apparatus of claim 6 wherein the fifth signal corresponds to a first sine wave function and the sixth signal corresponds to a second sine wave function ninety degrees out of phase with respect to the first sine wave function, wherein the microprocessor determines the angular position of the body based on a most linear region of the first or second sine waves.

8. The angular position sensing apparatus of claim 5 further comprising processing features for processing the signals from the first and second dual-axis accelerometers to correct for centrifugal and angular acceleration effects.

9. A alignment system for aligning a first shaft comprising:
- a sensor head coupled to the first shaft,
- a collimated light source disposed on the sensor head for transmitting an energy beam,
- a photosensitive sensor disposed on the sensor head for sensing light and generating a position signal therefrom,
- a first dual-axis accelerometer having a first sensing axis for sensing a first acceleration component and a second sensing axis for sensing a second acceleration component, wherein the first and second sensing axes are in substantially perpendicular relation, the first dual-axis accelerometer operable to output a first signal proportional to the sensed first acceleration component and to output a second signal proportional to the sensed second acceleration component, and
- a second dual-axis accelerometer having a third sensing axis for sensing a third acceleration component and a fourth sensing axis for sensing a fourth acceleration component, wherein the third and fourth sensing axes are in substantially perpendicular relation, the second dual-axis accelerometer operable to output a third signal proportional to the sensed third acceleration component and to output a fourth signal proportional to the sensed fourth acceleration component, and
- a processor for processing the signals generated by the fist and second dual-axis accelerometers, operable to provide an output corresponding to the angular position of the sensor head relative to the first shaft.

* * * * *